Figure 1:
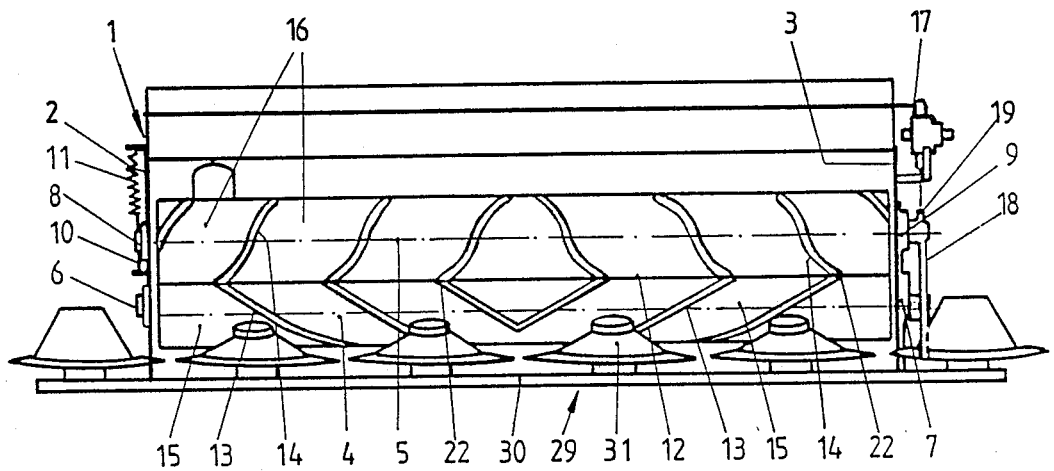

United States Patent [19]

Grenzebach

[11] Patent Number: 4,896,490
[45] Date of Patent: Jan. 30, 1990

[54] METHOD OF MANUFACTURING A CUT-UP MOWN-MATERIAL CARPET AND ROLLER-BASED PROCESSING MACHINE FOR CARRYING OUT THE METHOD

[75] Inventor: Hans Grenzebach, Gemünden, Fed. Rep. of Germany

[73] Assignee: Friedrich Mörtl Schleppergerätebau GmbH & Co. KG, Gemünden, Fed. Rep. of Germany

[21] Appl. No.: 214,954

[22] Filed: Jul. 5, 1988

[30] Foreign Application Priority Data

Jul. 21, 1987 [DE] Fed. Rep. of Germany ....... 3724039

[51] Int. Cl.⁴ .......................................... A01D 61/00
[52] U.S. Cl. ................... 56/16.4; 56/DIG. 1
[58] Field of Search ............ 56/16.4, DIG. 1

[56] References Cited

U.S. PATENT DOCUMENTS

| 3,656,284 | 4/1972 | Meek | 56/DIG. 1 |
| 4,075,822 | 2/1978 | Heckley | 56/DIG. 1 |
| 4,265,076 | 5/1981 | Krutz | 56/DIG. 1 |
| 4,671,051 | 6/1987 | Klinner | 56/DIG. 1 |
| 4,821,494 | 4/1989 | O'Halloran et al. | 56/DIG. 1 |

FOREIGN PATENT DOCUMENTS

| 1096181 | 2/1981 | Canada | 56/DIG. 1 |
| 2023274 | 12/1970 | Fed. Rep. of Germany | 56/DIG. 1 |
| 181589 | 11/1962 | Sweden | 56/DIG. 1 |

Primary Examiner—Stephen J. Novosad
Assistant Examiner—Gay Spahn
Attorney, Agent, or Firm—Max Fogiel

[57] ABSTRACT

In a method of manufacturing a cut-off mown-material carpet, the carpet is advanced through a processing nip 22 between two powered rollers 4 and 5 that rotate in opposite directions and have matching elevations 13 and 14 and depressions 15 and 16 in their surface, buckling the carpet. The carpet is advanced through the nip at different speeds at each surface of the carpet.

12 Claims, 1 Drawing Sheet

METHOD OF MANUFACTURING A CUT-UP MOWN-MATERIAL CARPET AND ROLLER-BASED PROCESSING MACHINE FOR CARRYING OUT THE METHOD

The invention concerns a method of manufacturing a cut-up mown-material carpet that travels through at least one processing nip between two powered rollers, which rotate in opposite directions and have matching elevations and depressions on their surface, and that is accordingly buckled. The roller-based processing machine that is employed on the cut-up mown-material carpet to carry out the method is equipped with at least two powered rollers that rotate in opposite directions, have matching and preferably mutually engaging elevations and depressions in the form of strips on their surface, and create between them a nip for processing the mown-material carpet. Roller-based processing machines of this type are also called conditioners or conditioning machines. They are often employed in conjunction with a disc-type reaper, with the cut-up mown-material carpet occurring directly along the direction of travel and immediately processed, buckled and compressed, that is, in the roller-based processing machine, subsequent to which the carpet is laid on the ground behind the processing machine. It is, however, also possible to build and operate the processing machine as a unit separate from the reaper. Two types of processing machine are known at the state of the art. One operates with impacting tools that are usually suspended in a drive unit. Due to the high speeds of rotation, the mown material, which, alfalfa for example, contains a percentage of foliage, is shattered, resulting in considerable loss because the shattered foliage cannot be recovered. The present invention does not concern this type of conditioner. The other type of conditioner involves two opposing rollers with elevations and depressions on their surface, with the mown-material carpet traveling through a processing nip, in which it is squeezed, compressed, and buckled. These roller-based processing machines are operated at comparatively low speeds of rotation. The processing machines that the present invention addresses are of this type.

A method and a processing machine of the aforesaid type are known from German OS 2 023 274 for example. The mutually associated rollers have matching elevations and depressions on their surface, creating a processing nip between them. The strip-like elevations and depressions are distributed over the surface of the rollers in a helix. The rollers are of the same diameter and are driven at the same speed, although in opposite directions to ensure that the elevations will interlock with the depressions. The surfaces of the rollers are made out of rubber, with the elevations and depressions created in it. The rollers can also only have elevations, with the depressions constituted by the shorter diameter between them. A mown-material carpet cut up by the disk-type reaper in front is accordingly processed, being buckled and on the whole compressed at intervals corresponding to each processing nip. The compression of the mown-material carpet, however, makes it detrimentally compact, and the mown material does not arrive on the ground in a loose enough deposit. To ensure rapid enough drying of the mown material, in fact, it is important not only to break up the stalks in the carpet by bending and squeezing them, but also to ensure a loose deposit in the windrow.

Mounting one roller on a stationary axis and the other on an axis that yields resiliently instead of mounting each roller on a stationary axis is also known. This measure not only prevents an especially thick mown-material carpet from being compressed too tightly but also allows such obstacles as stones, twigs, etc. to pass between the rollers without impermissibly damaging their surface, which usually consists of rubber. Securing the rubber surfaces to the usually round metal cores in order to obtain the rollers, furthermore, is comparatively expensive because they must often be vulcanized on. Again, the elevations and the rubber surface of the rollers as a whole are sensitive to wear. The edges of the elevations in particular will wear down, decreasing the squeezing action along with the loss of material. Furthermore, the resiliency of the elevations and depressions that is dictated by the rubber surface is in itself also detrimental to the processing. The known roller-based processing machines have rollers of equal diameter that are driven at approximately 1000 rpm. The diameter is approximately 220 mm.

Machining a profile into the surface of a roller made out of steel and operating it in conjunction with another roller that has more or less radially projecting strips of rubber on its surface is also known. The two rollers in this case have different diameters. Both rollers are driven at the same peripheral speed. The elevations are comparatively high and the depressions in the steel roller deep. This design as well, however, results in considerable compacting of the carpet that impedes loose deposition in the windrow. The stalks and feed constituents, furthermore, are not very well disintegrated inside the carpet because the buckling and squeezing action essentially affects only the outside. Again, gaps in which mown material can clog up and loosen necessarily occur between the sections of the rubber rollers, which can result in malfunction.

Constructing the cores of the rollers in the form of round components of steel and screwing strip-like rubber elevations to their surface is also known. The mutually associated rollers in this case are also of the same diameter and driven at the same speed.

The object of the invention is to provide a method and a roller-based processing machine of the aforesaid type that will not only buckle but also break up the constituents of the mown-material carpet, especially the stalklike and stemlike constituents. A disintegration process of this type is, in contrast to buckling, which acts rather at individual points, one that opens up the separate stalks to a certain extent, so that they are also to some extent broken up into fibers.

This object is attained in accordance with the invention in a method of the aforesaid type in that the mown-material carpet is advanced through the processing nip at different speeds on each side of its cross-section. This not only results in a buckling action in the processing nip but also helps to slide the constituents of the carpet back and forth. This relative mutual motion of the stalks in the processing nip causes them to rub up against one another and disintegrates them to a considerable extent. This friction affects not only the surface constituents of the mown-material carpet, but also those in the interior. The relative motion also counteracts a strictly compacting action on and the caking up of the carpet, resulting in loose deposition of the mown material in the windrow. The individual stalks are differentially intercepted at the two peripheral speeds employed over the cross-section of the carpet, ensuring that the processing will penetrate to a certain depth inside it. The friction simultaneously destroys the coating of wax on the stalks in a practical way. Furthermore, the different speeds tend to orient the stalks along the direction of travel to a certain extent, which decreases the felting action on the carpet. Another advantage of the difference in speeds, finally, is a certain self-cleaning action, meaning that any mown material adhering to the surface of the rollers is constantly released and removed as the rollers slide along each other.

It is even possible to vary and especially alternate the different speeds from processing nip to processing nip. Varying the different speeds from processing nip to processing nip will create various processing sections in the mown-material carpet, with friction of different strength in each. It will of course be evident, however, that all of these measures will be taken in such a way that the peripheral speeds of revolution of the elevations on each roller will be different.

The object of the invention is also attained in accordance with the invention in a roller-based processing machine of the aforesaid type in that the striplike elevations that are mounted on the mutually associated rollers and that demarcate the processing nip are revolved at different peripheral speeds. The cross-section of the carpet will accordingly simultaneously be acted upon and moved differently at each surface, resulting in sliding and tractional components of force that will, in conjunction with the friction on the part of the different constituents of the carpet, lead to the desired disintegration of the mown material without breaking up the small leaves or powerfully and detrimentally compacting the carpet.

Both the striplike elevations and the depressions can in a practical way be made out of metal. This not only simplifies manufacture but entails the additional advantage that metal is less subject to wear than rubber. The elevations and depressions can be integrated into the core of each roller. It is, however, also possible just to secure, by screwing or welding for example, elevations to a roller core with a round cross-section for example, automatically creating depressions between the elevations. The number of elevations and depressions on the two rollers, the diameters of the rollers, and the speeds at which they rotate must be coordinated to ensure that the processing nips will continue to be created in spite of the difference in peripheral speeds. The elevations and depressions can engage each other at the surface of the two rollers. It is, however, also possible to provide each roller only with elevations, creating a processing nip between two elevations on the mutually associated rollers. In this event the elevations will not engage either each other or matching depressions, but the elevations on each roller will face those on the other, demarcating a processing nip in each case. An embodiment of this type will allow greater freedom with respect to speed and diameter.

The ratio of the various peripheral speeds that occur in the processing nip can range from 1:2 to 1:4. The differences in peripheral speed are accordingly not minor and random but definite and considerable, with the objective of attaining satisfactory disintegration.

There are essentially two possible embodiments of the roller-based processing machine, although combinations are also conceivable. The rollers can have the same diameter and be driven at different speeds to attain different peripheral speeds. It is, however, also possible for the rollers to have different effective diameters and be driven at the same or at different speeds. Both versions have the advantage that the machine can be lower overall than those at the state of the art.

The elevations and depressions can be integrated into the surface of the rollers, which will accordingly not be round in cross-section. It is also possible to associate not only two rollers in order to create processing nips but to associate for example a third roller with the first and accordingly double the number of processing nips.

The rollers can be driven smoothly in relation to each other if the elevations and depressions are mutually distributed in helixes over the surface of the rollers so that the mown material is constantly engaged in the nip. The elevations and depressions can be distributed over the surface of the rollers in helixes that slope differently in accordance with their particular peripheral speed. The angles at which they slope must in this case be maintained when the elevations engage the depressions. The rollers can also be positioned close enough together as to almost or actually touch each other when idling. It will be evident that one of the two rollers must be resiliently mounted and that the extent of its play can be limited by adjustable stops.

The two mutually associated rollers can have a different number of elevations, and the ratio between the numbers of elevations on each roller can be the reciprocal of the ratio between their two speeds.

Figure 2:
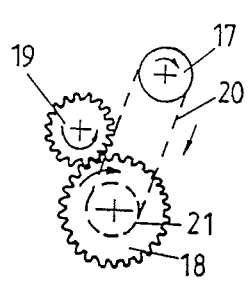
Figure 3:
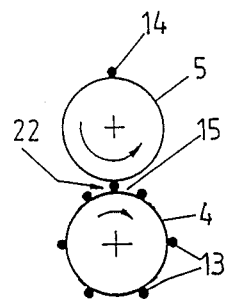
Figure 4:
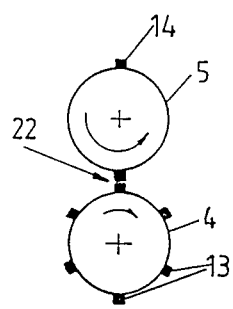
Figure 5:
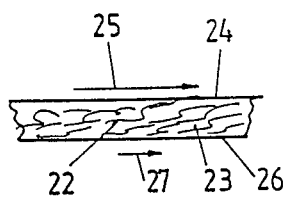
Figure 6:
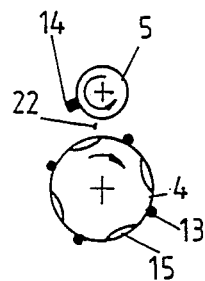
Figure 7:
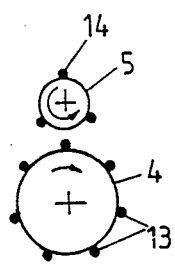
Figure 8:
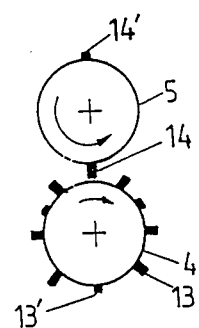

Various embodiments of the invention will now be specified with reference to the drawing, wherein FIG. 1 is a front view of a roller-based processing machine employed in conjunction with a disk-type reaper, FIG. 2 illustrates the mechanism that drives the two rollers, FIG. 3 illustrates one embodiment of the two rollers, each with the same diameter, FIG. 4 illustrates another embodiment of the two rollers, each again with the same diameter, FIG. 5 is a section through the mown-material carpet in the processing nip, FIG. 6 illustrates another embodiment that employs rollers of different diameters, FIG. 7 illustrates another embodiment, and FIG. 8 illustrates still another embodiment.

A roller-based processing machine, of which the parts requisite for its comprehension are illustrated in FIG. 1, has a frame 1, between the lateral components 2 and 3 of which two rollers 4 and 5 are mounted in such a way that they can rotate. Lower roller 4 rotates in bearings 6 and 7 mounted stationary in lateral components 2 and 3. The bearings 8 and 9 that upper roller 5 is mounted in can slide back and forth toward stationary bearings 6 and 7. The extent of travel is limited by stops 10 on each side or in the vicinity of lateral components 2 and 3. For the sake of simplicity only the stop 10 in the vicinity of lateral component 2 is illustrated. Springs 11 are also provided. Only the spring 11 in the vicinity of lateral component 2 is illustrated, although there is another one in the vicinity of lateral component 3. Springs 11 are preferably subject to tension from an appropriate pivoting component, and draw upper roller 5 down against stops 10, which can be appropriately adjusted and set.

Rollers 4 and 5 are driven in opposite directions, creating a nip 12 for a mown-material carpet to travel through. The surface of rollers 4 and 5 is provided with striplike elevations 13 and 14, between which depressions 15 and 16 are left or created. Depressions 15 and 16 can also, depending on the structure of elevations 13 and 14, be actually machined into the surface of elevations 13 and 14 as illustrated in FIG. 6. Elevations 13 and 14 extend in helixes over the circumference of rollers 4 and 5 and slope, as will be evident, at different angles, the extent of which depends on the particular speed of rotation. The rollers can be driven either by chain wheels or by cogwheels. Generally, the power is derived from the takeoff shaft of a tractor and supplied to a drive wheel 17. Lower roller 4 is provided with a cogwheel 18 and upper roller 5 with a cogwheel 19. The two wheels engage each other directly. Since the ratio of the numbers of teeth on cogwheels 18 and 19 is 3:1, upper roller 5 rotates three times as rapidly as lower roller 4. The slope of the helix traced by elevations 14 is accordingly steeper than that of the helix traced by the elevations 13 on lower roller 4. A drive mechanism of this type is illustrated again in FIG. 2, wherein the power is transmitted from drive wheel 17 by way of a chain 20 to a wheel 21 that is non-rotationally secured to cogwheel 18 and wherein cogwheel 19 meshes with cogwheel 18. It is also possible to use chain wheels alone or a combination of different types of gearing. What is essential is that rollers 4 and 5 rotate in opposite directions and that elevations 13 and 14 revolve at different speeds in each processing nip 22, which can be created between one elevation 13 on one side 4 and another elevation 14 on the other roller 5, between an elevation 13 on lower roller 4 and a depression 16 in upper roller 5, or between a depression 15 in lower roller 4 and an elevation 14 on upper roller 5. When, as illustrated in FIG. 1, both rollers 4 and 5 have the same diameter, they absolutely must be rotated at different speeds. It is on the other hand also possible to rotate both rollers at the same speed if the requisite difference in peripheral speeds can be attained by making rollers 4 and 5 of different diameter. Finally, the different peripheral speeds can be attained by rotating rollers of different diameter at different speeds. The mown-material carpet 23 illustrated in FIG. 5 is traveling through a processing nip 22 with one surface 24 being processed at a peripheral speed represented by arrow 25 and deriving for example from the elevations 14 on upper roller 5 and its lower surface 26 being processed at a peripheral speed represented by arrow 27 deriving for example from a depression 15 on lower roller 4. The two speeds 25 and 27 are at a ratio of 3:1. The result, accordingly, is significant differences in the peripheral speeds that mown-material carpet 23 is being processed at, entailing not only effects on surfaces 24 and 26 but also in the interior of the carpet. The result is that the individual constituents of the carpet rub against each other, destroying the layer of wax on the stalks along with a disintegrating action that to a certain extent breaks them open and breaks them down into fibers. Added to these effects of course is the buckling action exerted on the stalks and other constituents known at the state of the art.

FIGS. 3 and 4 and 6 through 8 are highly schematic illustrations of various potential embodiments of the roller-based processing machine in accordance with the invention. The rollers 4 and 5 in all of these illustrations are for simplicity's sake represented as one on top of the other, meaning that their axes are in a vertical plane. In practice, however, it would be preferable to displace the axis of upper roller 5 slightly downstream as represented by the cogwheels 18 and 19 in FIG. 2, in which the direction that the carpet travels in is represented by an arrow 28.

The rollers 4 and 5 illustrated in FIG. 3 have the same diameter and similar striplike elevations 13 and 14. In the simplest version elevations 13 and 14 can be round metal rods welded to the surface of the rollers. The elevations can be straight, paralleling the axis of the rollers, or helical as illustrated in FIG. 1. Lower roller 4 has six elevations 13 distributed uniformly along its circumference. The different speeds of rotation represented by the arrows of different length are intended to be at a ratio of 3:1, meaning that upper roller 5 rotates three times as rapidly as lower roller 4. Rollers 4 and 5 are coupled together by way of the drive mechanism in such a way that one elevation 14 on upper roller 5 will engage a depression 15 in lower roller 4, creating a processing nip 22 at that point. Once lower roller 4 has rotated 1/6 of a total rotation farther and upper roller 5 has accordingly completed half a rotation, the other elevation 14 will engage the next depression 15 in lower roller 4 and create another processing nip 22. The processing nip 22 in this embodiment will accordingly always be created between an elevation 14 and a depression 15. Obviously, another processing nip 22, created when an elevation 13 on lower roller 4 acts in conjunction with a depression 16 on upper roller 5, will always occur between the illustrated processing nips 22. Thus, two successive processing nips 22 will always differ slightly in diameter, so that the peripheral speeds that mown-material carpet 23 is processed at will always alternate and fluctuate slightly. This means that the processing nip will migrate slightly radially away from the rollers, which is in no way a drawback. It is especially important for the peripheral speeds in the processing nip to differ significantly from each other in their absolute values as illustrated in FIG. 5.

The elevations 13 and 14 on the rollers 4 and 5 in the embodiment illustrated in FIG. 4 are metal strips with a polygonal cross-section, with lower roller 4 again having six elevations 13 and upper roller 5 two elevations 14. Since the axes of rollers 4 and 5 are comparatively somewhat farther apart, the elevations do not engage the depressions. The processing nip 22 in this case is created between elevations 13 and 14 and its diameter or demarcating surface remains constant rather than alternating. Elevations 13 and 14 can of course also be in the form of segments and extend over a wide radial angle.

The rollers 4 and 5 in the embodiment illustrated in FIG. 6 have different diameters. The different peripheral speeds at which the mown-material carpet is processed are obtained in this case by rotating the rollers at speeds at a ratio of 4:1. Lower roller 4 has two striplike elevations 13 and four depressions 15 machined into its surface, and upper roller 5 has only one elevation 14 that extends farther out than elevations 13 and operates in conjunction with depressions 15. The result is two different processing nips 22, one between elevation 14 and each depression 15 and another type between the surface of upper roller 5 and the elevations 13 on lower roller 4.

If the rollers engage each other by way of their elevations as illustrated in FIGS. 3 and 6, a particular ratio between speeds of rotation will be necessary to ensure that the correct relationship between the various components will always be obtained or maintained. Elevations 13 and 14 must be designed to ensure that they will always engage depressions 15 and 16 and disengage from them. If on the other hand elevations 13 and 14 constitute a processing nip 22 in themselves as illustrated in FIG. 4, there is a wider range of freedom in how they are designed and in their longitudinal extent even though the speeds of rotation must still be maintained, The design is not restricted to the illustrated number of elevations 13 and 14. FIG. 7 for example illustrates an embodiment wherein lower roller 4 has seven elevations 13 and upper roller 5 three elevations 14. Since rollers 4 and 5 also differ in diameter, it is again possible to establish a difference in peripheral speeds.

The rollers 4 and 5 in the embodiment illustrated in FIG. 8 have the same diameter and rotate at different speeds. On the surface of rollers 4 and 5 are two different kinds of elevations 13 and 13'. Upper roller 5 has elevations 14 and 14' of different height. This is another way of creating processing nips 22.

A roller-based processing machine of the type described herein can be a separate machine. It is, however, also possible to integrate it into a reaper 29, which is positioned forward in the direction of travel in FIG. 1. The reaper has a cutter bar 30 with individual disks 31 mounted on it. The disks are driven along the beam by a train of cogwheels or similar structures. The drive mechanism is for simplicity's sake not illustrated. It will be evident from FIG. 1 that the operating width of the reaper is greater than that of rollers 4 and 5. This is because outer disks 31 can be provided with conveyor mechanisms to advance the reaped carpet horizontally, so that the rollers do not have to be as long and can have less of an operating width in order to process the reaped mown-material carpet.

What is claimed is:

1. A method of producing a cut-up mown-material carpet, comprising the steps: providing two powered rollers with surfaces having matching strip-shaped elevations and depressions; moving said carpet through at least one processing nip between said two powered rollers; rotating said two-rollers in opposite directions for buckling said carpet; and advancing said carpet through said processing nip at different speeds on each side of the cross-section of the carpet; said rollers having peripheral speeds differing from each other at a constant ratio so that an elevation on one roller always cooperates with a depression on the other roller, said matching elevations and depressions being mutually engaging, each pair of matching elevations and depressions producing a nip for processing said carpet therein; rotating said strip-shaped and mutually engaging elevations and depressions at different peripheral speeds, the carpet center being reached through the cooperative action of said elevation and depression, the nip location between one elevation on one roller and a depression on the other roller changing from nip to nip, an elevation having a greater peripheral speed than a cooperating depression at one moment has a lower speed than a cooperating depression at another moment so that the peripheral speeds applied against two carpet surfaces change always alternatively.

2. A method as defined in claim 1, wherein said peripheral speeds are varied and alternated from processing nip to processing nip.

3. Apparatus for producing a cut-up mown-material carpet, comprising: two powered rollers with surfaces having matching strip-shaped elevations and depressions; means for moving said carpet through at least one processing nip between said two powered rollers; means for rotating said two rollers in opposite directions for buckling said carpet; means for advancing said carpet through said processing nip at different speeds on each side of the cross-section of the carpet; said rollers having peripheral speeds differing from each other at a constant ratio so that an elevation on one roller always cooperates with a depression on the other roller, said matching elevations and depressions being strip-shaped and mutually engaging; each pair of matching elevations and depressions producing a nip for processing said carpet therein; means for rotating said strip-shaped and mutually engaging elevations and depressions at different peripheral speeds, the carpet center being reached through the cooperative action of said elevation and depression; the nip location between one elevation on one roller and a depression on the other roller changing from nip to nip; and elevation having a greater peripheral speed than a cooperating depression at one moment has a lower speed than the cooperating depression at another moment so that the peripheral speeds applied against two carpet surfaces change always alternatively.

4. Apparatus as defined in claim 3, wherein said strip-shaped elevations and depressions are comprised of metal.

5. Apparatus as defined i claim 3, wherein said ratio is within the range of 1:2 to 1:4.

6. Apparatus as defined in claim 3, wherein said rollers have the same diameter and different speeds.

7. Apparatus as defined in claim 3, wherein said rollers have different effective diameters and are driven at the same speed.

8. Apparatus as defined in claim 3, wherein said rollers have different effective diameters and are driven at different speeds.

9. Apparatus as defined i claim 3, wherein said elevations and depressions are integrated into the surface of said rollers, said rollers having a non-round cross-section.

10. Apparatus as defined in claim 3, wherein said elevations and depressions are distributed over the surface of said rollers in helixes sloping differently dependent on the peripheral speed of said rollers.

11. Apparatus as defined in claim 3, wherein each of said rollers has a different number of elevations, the ratio of the number of elevations on one roller to the number of elevations on the other roller being the reciprocal of the ratio of the different speeds of said two rollers.

12. Apparatus for producing a cut-up mown-material carpet, comprising: two powered rollers with surfaces having matching strip-shaped elevations and depressions; means for moving said carpet through at least one processing nip between said two powered rollers; means for rotating said two rollers in opposite directions for buckling said carpet; means for advancing said carpet through said processing nip at different speeds on each side of the cross-section of the carpet; said rollers having peripheral speeds differing from each other at a constant ratio so that an elevation on one roller always cooperates with a depression on the other roller, said matching elevations and depressions being strip-shaped and mutually engaging; each pair of matching elevations and depressions producing a nip for processing said carpet therein; means for rotating said strip-shaped and mutually engaging elevations and depressions at different peripheral speeds, the carpet center being reached through the cooperative action of said elevation and depression; the nip location between one elevation on one roller and a depression on the other roller changing from nip to nip; an elevation having a greater peripheral speed than a cooperating depression at one moment has a lower speed than a cooperating depression at another moment so that the peripheral speeds applied against two carpet surfaces change always alternatively; said strip-shaped elevations and depressions being comprised of metal; said ratio occurring in said processing nip being within the range of 1:2 to 1:4; said rollers having the same diameter and being driven at different speeds; said elevations and depressions being distributed over the surface of said rollers in helixes sloping differently dependent on the peripheral speeds of said rollers; each of said rollers having a different number of elevations, the ratio of the number of elevations on one roller to the number of elevations on the other roller being the reciprocal of the ratio of the speeds of said two rollers.

* * * * *